(12) United States Patent
Abu-Ghazaleh et al.

(10) Patent No.: US 8,380,846 B1
(45) Date of Patent: *Feb. 19, 2013

(54) AUTOMATIC CLUSTERING FOR SELF-ORGANIZING GRIDS

(75) Inventors: Nael Abu-Ghazaleh, Vestal, NY (US); Weishuai Yang, Ozone Park, NY (US); Michael Lewis, Vestal, NY (US)

(73) Assignee: The Research Foundation of State University of New York, Binghamton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/243,125

(22) Filed: Sep. 23, 2011

Related U.S. Application Data

(63) Continuation of application No. 12/236,396, filed on Sep. 23, 2008, now Pat. No. 8,041,773.

(60) Provisional application No. 60/974,834, filed on Sep. 24, 2007.

(51) Int. Cl.
*G06F 15/173* (2006.01)

(52) U.S. Cl. ........... 709/224; 709/226; 706/13; 707/737

(58) Field of Classification Search .................. 709/209, 709/105, 224, 226; 718/100, 105; 370/217, 370/254; 1/1; 707/100, 737; 706/13
See application file for complete search history.

(56) References Cited

U.S. PATENT DOCUMENTS

| | | | | |
|---|---|---|---|---|
| 6,859,927 | B2 * | 2/2005 | Moody et al. | 718/100 |
| 7,624,118 | B2 * | 11/2009 | Schipunov et al. | 1/1 |
| 8,041,773 | B2 * | 10/2011 | Abu-Ghazaleh et al. | 709/209 |
| 2001/0034752 | A1 * | 10/2001 | Kremien | 709/105 |
| 2004/0267901 | A1 * | 12/2004 | Gomez | 709/217 |
| 2006/0074940 | A1 * | 4/2006 | Craft et al. | 707/100 |
| 2006/0248141 | A1 * | 11/2006 | Mukherjee | 709/203 |
| 2007/0041335 | A1 * | 2/2007 | Znamova et al. | 370/254 |
| 2008/0320121 | A1 * | 12/2008 | Altaf et al. | 709/224 |
| 2009/0049443 | A1 * | 2/2009 | Powers et al. | 718/100 |

* cited by examiner

*Primary Examiner* — Jungwon Chang
(74) *Attorney, Agent, or Firm* — Steven M. Hoffberg; Ostrolenk Faber LLP

(57) ABSTRACT

A method for clustering of nodes for a task, and cluster so provided comprising an automatically partitioned a set of nodes having a branched hierarchy of subsets based at least on a relative distance according to at least one node characteristic distance metric, each subset having a communication node, each node within the subset being adapted to communicate control information with the communication node, and the communication nodes of respective subnets which are hierarchically linked, being configured to communicate control information with each other; and a set of output preferred nodes for allocation of portions of a task, wherein the output set of preferred nodes is dependent on both the hierarchy and the task.

21 Claims, 3 Drawing Sheets

AUTOMATIC CLUSTERING FOR SELF-ORGANIZING GRIDS

CROSS REFERENCE TO RELATED APPLICATIONS

The present application is a Continuation of U.S. patent application Ser. No. 12/236,396, filed Sep. 23, 2008, which is a non-provisional of U.S. Provisional Patent Application Ser. No. 60/974,834, filed Sep. 24, 2007, the entirety of which are expressly incorporated herein by reference.

GOVERNMENT SPONSORSHIP

This invention was made with government support under Grant ACI-0133838, CNS-0454298 awarded by the National Science Foundation, and under contract FA8750-04-1-0054 awarded by the Air Force Research Laboratories. The Government has certain rights in the invention.

BACKGROUND OF THE INVENTION

This application expressly incorporates by reference in its entirety the Doctoral Dissertation of Weishuai Yang, entitled: "Scalable And Effective Clustering, Scheduling And Monitoring Of Self-Organizing Grids", Graduate School of Binghamton University State University of New York, September, 2008.

Although a number of computational grids have begun to appear, truly large-scale "open" grids have not yet emerged or been successfully deployed. Current production grids comprise tens, rather than hundreds or thousands, of sites [1, 3]. The primary reason is that existing grids require resources to be organized in a structured and carefully managed way, one that requires significant administrative overhead to add and manage resources. This overhead is a significant barrier to participation, and results in grids comprising only large clusters and specialized resources; manually adding individual resources—especially if those resources are only intermittently available—becomes infeasible and unworthy of the effort required to do so.

An alternative model for constructing grids [4] lowers the barrier for resource and user participation by reducing various administrative requirements. In this Self-Organizing Grids (SOGs) model, resource owners would directly and dynamically add their resources to the grid. These resources may include conventional clusters that permanently participate in the grid, or that are donated by providers during off-peak hours. In addition, users may provide individual resources in much the same way that they add them to peer-to-peer networks and public resource computing projects such as SETI@home [2]. The grid would then consist of the currently participating resources. SOGs might contain different tiers of resources, ranging from always connected large clusters, to individual PCs in homes, down to small-scale sensors and embedded devices. Thus, SOGs represent the intersection of peer-to-peer computing, grid computing, and autonomic computing, and can potentially offer the desirable characteristics of each of these models.

Constructing grid services that can operate in, let alone take advantage of, such an environment requires overcoming a number of challenges and requires different algorithms and designs [4]. One of the primary challenges, namely how to automatically discover efficient clusters within SOGs, to enable effective scheduling of applications to resources in the grid has not been adequately addressed in the prior art.

A candidate collection of SOG nodes may not necessarily be a physical cluster of co-located machines under a single administrative domain connected by a high-speed network; but the nodes' proximity to one another—in terms of network connection performance characteristics—may allow them to serve as an ad hoc cluster to support some applications. A brute force approach to the problem of discovering ad hoc clusters would periodically test network performance characteristics between all pairs of resources in the grid. Clearly, this approach is not feasible for a large scale system; more scalable approaches are needed.

The need for clustering arises in P2P environments, where it has received significant research attention [8, 13, 5, 9]. In P2P environments, clusters are needed for scalability of document search and exchange. Clusters are created and maintained in a large and dynamic network, where neither the node characteristics nor the network topology and properties (such as bandwidth and delay of edges) are known a priori. To improve performance, cluster nodes must be close enough to one another, and must typically fulfill additional requirements such as load balancing, fault tolerance and semantic proximity. Some of these properties are also desirable for SOGs. However, the emphasis on proximity is much more important to SOGs, since the computational nature of grid applications may require close coupling. Further, to allow flexible application mapping, variable size clusters must be extractable; in contrast, the emphasis in P2P networks is usually on finding clusters of a single size.

Clustering in SOGs is more complicated than classical dominating set and p-center problems from graph theory, which are themselves known to be NP-complete. Simple strategies such as off-line decisions with global knowledge do not work because of the large scale and dynamic nature of the environment. Further, the importance of cluster performance (because of its intended use), along with the requirement to create variable size clusters, suggest the need for different solutions. An optimal solution that measures the quality of connections between all pairs of nodes, and that then attempts to extract the optimal partition of a given size, requires $O(n^2)$ overhead in the number of messages to measure the connections, and an NP-complete optimal clustering solution. Further, the dynamic nature of the problem in terms of the network graph and processor and network loads requires lighter weight heuristic solutions.

To support general large-scale parallel processing applications, SOGs must self-organize in a way that allows effective scheduling of offered load to available resources. When an application request is made for a set of nodes, SOGs should be able to dynamically extract a set of resources to match the request. Since these resources are often added separately and possibly by multiple providers, SOGs should be able to identify and track relationships between nodes. In addition, to support effective scheduling, the state of resources in the grid must be tracked at appropriate granularity and with appropriate frequency.

An important initial question is "What represents an effective cluster?" Clearly, the capabilities of the individual nodes are important. However, the influence of communication often has a defining effect on the performance of parallel applications in a computational cluster. Moreover, it is straightforward to filter node selection based on node capabilities, but it is much more challenging to do so based on communication performance, which is a function of two or more nodes.

Highways [8] presents a basic solution for creating clusters through a beacon-based distributed network coordinate system. Such an approach is frequently used as the basis for other P2P clustering systems. Beacons define a multidimensional space with the coordinates of each node being the minimum hop-count from each beacon (computed by a distance vector approach or a periodic beacon flood). Distances between nodes are measured as Cartesian distances between coordinates. Highways serves as the basis for several other clustering approaches. Shortcomings include the fact that the distance in the multi-dimensional space may not correspond to communication performance, that markers must be provided and maintained, and need to centrally derive the desired node clustering.

Agrawal and Casanova [5] describe a pro-active algorithm for clustering in P2P networks. They use distance maps (multi-dimensional coordinate space) to obtain the coordinates of each peer, and then use a marker space (not the same concept as in Highway) as the cluster leader by using the K-means clustering algorithm. The algorithm chooses the first marker (leader) randomly, then repeatedly finds a host of distance at least D from all current markers, and adds it into the marker set. Nodes nearest to the same marker are clustered together, and are split if the diameter becomes too large. This strategy results in message flooding and its associated high overhead.

Zheng et. al. [13] present T-closure and hierarchical node clustering algorithms. The T-closure algorithm is a controlled depth-first search for the shortest paths, based on link delay. Each node learns all shortest paths starting from itself, with distance not larger than T. The hierarchical clustering algorithm uses nomination to select a supernode within some specified distance. These two strategies require high overhead and do not support node departure.

Xu and Subhlok describe automatic clustering of grid nodes [9] by separating the clustering problem into two different cases. Their approach uses multi-dimensional virtual coordinates to cluster inter-domain nodes, and uses $n^2$ direct measures to cluster intra-domain nodes. This strategy can classify existing nodes into clusters according to physical location, but cannot extract variable sized clusters according to user requirements.

SUMMARY AND OBJECTS OF THE INVENTION

In order to address the issue of co-scheduling of specific resources to quantify the relationship (i.e. distances in terms of link delay) among different resources within a computational infrastructure network or a set of computational or infrastructure resources, especially those that span multiple administrative domains, an automated system is provided for assessing the quality of multiple heterogeneous resources available collectively to support a given job. This can be done on demand or proactively. The problem is complicated because the number of resource sets of interest is exponential, making brute-force approaches to extracting their state impractical. It's almost impossible to have all the information collected in advance. On the other hand, it's also impractical to search nodes purely on demand, especially from the scalability point of view.

A scalable solution for organizing a set of resources is provided that preferably adopts a link-delay sensitive overlay structure (MDTree) to organize nodes based on their proximity to one another, with only a small number of delay experiments. Both proactive information collection and on-demand confirmation are combined. This overlay provides a variable-size set of promising candidate nodes that can then be used as a cluster, or tested further to improve the selection. The system may be centrally controlled, subject to distributed or ad hoc control (e.g., a self-organizing system), or some hybrid approach with both dedicated or specialized control structures and control functions implemented proximate to the resources which seek to interoperate. The resources may be processing, memory, communications, or other elements capable of providing other functions necessary or desirable to complete a task.

To support effective scheduling, not only the quality but also the changing state of resources in the Grid system should be tracked at appropriate granularity and frequency. The difficulty comes from the fact of distributed computing: Since every node may only have some incomplete information of the system, even obtaining the global view of the system is not easy. Furthermore, a self-organizing grid should gracefully tolerate a significant portion of its participating resources to be dynamically added or removed, even those that are being used by active computations. Such tolerance imposes an additional burden on the state tracking system. One aspect of the technology provides that the topology is concurrently available to accomplish tasks which are partitioned to various nodes, and also subject to maintenance in the event that the u8nderlying resources change in availability or use. Thus, while a particular subtask allocated to a particular resource need not be tolerant to a change in that particular resource, the distributed task being jointly performed by the set of nodes is generally tolerant of such changes.

A structure for efficient resource discovery and monitoring is provided. On the one hand, resource information storage is distributed on nodes and aggregated hierarchically; queries only go through pruned branches. The aggregated resource information is structured in a relational model on each node. On the other hand, the adoption of the relational model provides efficient support for range queries in addition to equality queries, and the hierarchical distributed architecture provides efficiency, scalability and fault tolerance.

Based on the MDTree overlay and resource aggregation, a Group-Scheduling framework for self organizing grid architecture is provided to allow scalable and effective scheduling of parallel jobs, each of which employs multiple resources, to available resources that can support each job most efficiently. In addition to tracking the capabilities of resources and their dynamic loads, the framework takes into account the link delay requirements of parallel jobs. Group-scheduling uses the aggregated resource information to find "virtual clusters", a group of nearby suitable resources based on variable resource evaluation strategies.

Security is provided by providing as separate processes user registration and node participation. On the one hand, the participation of a new node does not mean that all the users on that node gain access to the self organizing grid. On the other hand, a single user should not have to be authenticated more than once for using resources in the system.

A distributed authorization architecture is preferably provided for the self organizing grid environment. Its characteristics include distributed attribute repository, role-based authorization, a reusable access token, and flexible access control with distributed decision making. A particular feature is its great emphasis on the autonomy of resource access control.

Automatic Grid structure discovery mechanisms are therefore provided to allow resources to self-organize efficiently into groups, with little or no administrative intervention. Without such mechanisms, on-demand discovery of mutually suitable resources is difficult. Thus, automatically discovering Grid structure and identifying virtual clusters (nodes that are close one another and able to sustain communicating applications effectively) of varying sizes at a reasonable overhead is the first step to be achieved.

Schedulers are permitted to make effective placement decisions based on up-to-date information, and to better balance Grid load and satisfy application requests for resources, by providing lightweight adaptive monitoring of the dynamic state of a potentially massive number of resources across a Grid. Likewise, since the architecture supports tracking of a large number of resources, the system can effectively subdivide physical systems into a number of logical components.

Effective resource monitoring, resource quality evaluation, and dependent parallel task dispatching to suitable resources are achieved in a scalable fashion.

One aspect of the system provides a variable size automatic node clustering based on link delay.

Another aspect provides distributed hierarchical resource management with efficient updating and range query capability.

A further aspect provides efficient group-scheduling for parallel applications with inter-dependent tasks with communication costs taken into consideration.

A still further aspect provides distributed resource authorization for SOGs. We use the phrase self-organizing grid (SOG) to describe a set of networked computing nodes that may be part of some logical organization, and that have some ability to "self-organize", perhaps only by virtue of the approaches described herein. The essential characteristics of the underlying environment are that the computing nodes can communicate with one another, and that they can be used to solve some computing problem. Therefore, the technology has broader application than to the "self-organizing grids" described in the art, and is not limited to application in or to such systems.

A new simulation framework is provided, capable of accurate modeling and efficient simulation for peer-to-peer and self-organizing grid environments.

To support general large-scale parallel processing applications, self organizing grids (SOGs) must self-organize in a way that allows effective scheduling of offered load to available resources. To achieve the best performance for the whole Grid system and also for each individual application and dispatched job, the resources need to be effectively allocated. Unlike classical parallel and distributed scheduling formulations, which most commonly consider the issue of scheduling one job to one resource, the resource allocation problem in a SOG context means allocating a set of resources to a job. When an application makes a request for a set of resources, SOGs should be able to efficiently identify relationships between available resources and select the most suitable resources. This essentially can be considered as allocating a set of Grid nodes to a job based on the criteria for resources. Various of criteria for selecting nodes can be used. It could be based on link delay among one another, CPU frequency, memory space, etc, depending on different needs.

Nevertheless, link delay is usually one of the most important criteria, since the Grid is designed for collaboration. For parallel jobs where different processes need to communicate, resource allocation is critically influenced by the tightness of coupling and communication characteristics among the allocated nodes. This is especially true in wide-area Grids where the delays between different nodes can vary widely. Since such jobs are of considerable interest to Grid systems, the scheduling framework must allow the extraction of resources that are mutually compatible. As a result, to be able to efficiently extract variable size mutually compatible virtual clusters, the system needs to monitor not only the individual resources, but also their relationship to each other.

Thus, to achieve best performance, it's very important for SOG to dynamically extract the underlying topology of the network in a scalable way to enable the scheduler to extract variable size "virtual clusters" that are mutually close to one another.

In determining an optimal clustering of nodes both the capability and location (in a relevant space, according to an appropriate metric) of respective nodes may be important. For example, a distant or inaccessible node with substantial capabilities may be less useful than one or more proximate or low latency communications nodes. Indeed, the issue is a bit more complex when one considers a computing cluster as part of a larger grid or self-organizing network. Ideally, the nodes within a group interoperate efficiently. For example, where communications between nodes within a group are low latency and high bandwidth, the capabilities of each of the nodes in the group may be scaled to provide increased performance in parallel applications in a computational cluster. As the linkage between nodes becomes slower, less capable, or less reliable, the scalability typically diminishes.

To support effective scheduling, the relationship and state of nodes in the Grid system must be tracked at appropriate granularity and with appropriate frequency. Scheduling of parallel applications often takes into account both the underlying connectivity and the application topology. Even though in custom parallel machines, and perhaps small size networks, it is reasonable to assume that the infrastructure topology is static and transparent to the scheduler/application, this is clearly not the case in wide-area Grids, especially the ones with dynamic membership such as SOGs. Scheduling with the knowledge of application topology allows for more precise and effective scheduling, but places an extra burden on the programmer to expose this topology to the system.

One aspect of automatic clustering challenge is to extract the structure of the SOG from a performance perspective. Difficulties may be presented by two aspects: (1) measurements to determine the all-pair network properties between nodes (O(n2) to measure all links); and (2) a graph clustering algorithm that extracts candidate virtual clusters of the desired size, which is NP-complete in terms of computational complexity.

A related issue arises when a distributed control system is employed, in which the overlay that exposes the structure is constructed and used by distributed algorithms to organize the nodes into leaders and peers according to some performance-related criteria without global knowledge.

Simple strategies for the establishment of grids, that might otherwise be applied, such as off-line decisions with global knowledge do not work because of the large scale and dynamic nature of the environment. Further, the importance of cluster performance (because of its intended use), along with the requirement to create variable size clusters, suggests the need for different solutions.

One embodiment of the present system provides a scalable solution to automatic clustering in SOGs. A flexible overlay structure, called a Minimum-delay Dynamic Tree (MDTree), is built and maintained to allow an initial sorting of the nodes based on a small number of delay experiments for every joining node. The MDTree organizes nodes as they join, keeping nearby nodes close together in the tree. As nodes join, a grouped set of nodes may exceed the group size threshold and the group must be split. Obviously, effective partitioning when splits occur is critical to the performance of the approach, since the problem is NP-complete. A genetic algorithm may be used for bi-partitioning.

Peer resources (nodes) are arranged hierarchically in tiers, using a dynamic control system which permits changes in the architecture during task processing. That is, the network remains available to accept and process tasks as the network availability of nodes changes, with the logical relationships of available nodes also changing as necessary or desirable. The nodes include processors, and these processors may be used to complete portions of a task as well as to provide distributed control capability. In a symmetric case, each node has sufficient capability and stored program instructions to implement most or all portions of a control algorithm, and therefore the loss of any one node or communication pathway will not block the ability of the SOG to remain operational. In an asymmetric case, various nodes have specialization in function, though there remain sufficient nodes available with capability to maintain operation of the SOG distributed throughout the network of nodes to provide fault tolerance and self-organizing capabilities.

The hierarchical tree of subsets of nodes is maintained dynamically as nodes join and leave. To better balance the tree, a genetic algorithm may be used to partition groups of nodes under a common parent (i.e. neighborhoods of a super-node). This enables the tree to maintain relatively small groups of mutually close nodes.

Embodiments of the present invention provides systems and methods which, for example, focus on cluster selection in an SOG based on communication performance. Of course, other metrics may be employed analogously. In order to simplify the analysis, it is assumed that all SOG nodes are capable of participating in clusters, and for example have similar capabilities. It is understood that this presumption is not a limitation of the invention, and that the analysis may be extended to address this inhomogeneity.

The automatic clustering challenge is to extract the structure of the SOG from a performance perspective; out of the unorganized or partially organized set of SOG resources, how can the structure that is available to conventional grids be dynamically and automatically discovered? A preferred solution according to the present invention to provide a scalable solution to automatic clustering in SOGs is to create a hierarchy within the system and to localize most of the interactions to a small number of nearby nodes. The base problem in constructing the overlay that exposes structure is how to use distributed algorithms to organize the nodes into leaders and peers according to some performance-related criteria, without global knowledge.

A flexible overlay structure, called a Minimum-delay Dynamic Tree (MDTree), is built and maintained to allow an initial sorting of the nodes based on a small number of delay experiments for every joining node. The MDTree organizes nodes as they join, keeping nearby nodes close together in the tree. As nodes join, a grouped set of nodes may exceed the allowed threshold as nodes and the group must be split. Effective partitioning when splits occur is critical to the performance of the approach; because the problem is NP-complete, and a genetic algorithm is preferably used for bi-partitioning. The MDTree overlay structure is then used when users generate requests for clusters, to identify effective clusters of a given size efficiently. As a result, it becomes possible to find clusters of specified sizes with low average delay among the nodes.

Simulation of the performance of this approach shows favorable results. By using an MDTree, the message overhead for finding a cluster can be kept linear with respect to cluster size, and the average link delay within the formed cluster is close to optimal.

Traditional computational grids that comprise multiple physical clusters may still benefit from an embodiment of the present automatic clustering approach. In particular, when a large-scale application requires a set of machines that exceeds the size of the largest available cluster, the present approach will consider the delay between nodes at different sites, and can help identify a large multi-organizational collection of machines to support the application.

The nodes may be pre-clustered using an overlay organization called a Minimum-Delay Tree (MDTree). Since nearby nodes in this structure have small delay to each other, variable size on-demand clustering considers only a small subset of the nodes. Each level in an MDTree consists of a neighborhood in which each node is a representative of another neighborhood at a lower level, recursively down to the leaf nodes. Inter-node delays among nodes within the same neighborhood are relatively small.

An MDTree makes it easier to find a specified number of nodes with minimum average delay. By using a hierarchical tree overlay structure, MDTree controls the complexity of node joins and cluster extraction to $O(Log_k N)$, where K is the size of neighborhood on each layer in the tree and N is the number of nodes.

An MDTree employs a hierarchically layered tree structure. Nodes on the same branch of the tree are organized so that they are close to one another in terms of link delay. This structure helps to satisfy requests with clusters that have small internal average link delays.

An MDTree employs a hierarchically layered tree structure. Nodes on the same branch of the tree are organized such that they are close to one another in terms of link delay. More generally, the node are represented within a space, and the nodes are clustered based on a metric appropriate for that space which provides an optimum performance. When the nodes are employed for parallel computation, the link delay between respective nodes provides a rational basis for co-clustering within a subset, since inter-node communications speed is an important determinant of performance, especially of the nodes have similar capability and are on a single type of network. This structure helps requests to be satisfied with clusters that have small internal average link delays.

On each level, a super-node within each subset keeps information of the number of nodes it is controlling and the number of nodes controlled by each of its peer-nodes. This information is very useful for formatting clusters on demand. Clearly, super-nodes and regular peer-nodes have different levels of responsibilities in MDTrees. A super-node is a leader on all layers from 1 to the second highest layer it joins. Each super-node must participate in query and information exchange on all the neighborhoods it joins, which can make it heavily burdened. However, if higher layer super-nodes did not appear within neighborhoods at lower layer neighborhoods, it would be inefficient to pass information down to neighborhoods at lower layers.

Overlay Pre-Clustering with Minimum Delay Dynamic Trees

Clustering algorithms may be classified into two categories: pro-active and on-demand. Most existing algorithms are pro-active; that is, given a set of nodes that join dynamically, the goal is to organize them into clusters as they join. On-demand systems do not maintain clusters in advance but construct them from scratch when required. SOGs may be supported whose diverse applications may lead to users requesting clusters of various sizes. Therefore, either different size clusters must be built pro-actively (significantly increasing the overhead), or an on-demand approach must be employed. A purely pro-active system results in high overhead and inflexibility, whereas a purely on-demand system requires significant dynamic overhead that can introduce scheduling delay. A preferred embodiment of the present system and method pro-actively organizes the nodes into an overlay that makes on-demand construction of variable size clusters efficient.

The problem of finding an optimal variable size cluster is NP-complete [13]; $O(n^2)$ delay experiments (ping messages) are needed to collect the full graph edge information. Therefore, an objective is to find an approximation of the optimal solution. Thus, adaptive heuristic approaches that can provide efficient solutions with more acceptable overhead in terms of communication and runtime are preferred.

Banerjee et. al. [6] provides for hierarchically arranging peers in tiers. According to one embodiment, the present system and method extends this technique for more effective operation with respect to computational clustering, and to enable dynamic cluster formation. The tree is maintained dynamically as nodes join and leave. To better balance the tree, a genetic algorithm may be employed to partition groups of nodes under a common parent (i.e. neighborhoods of a super-node). This enables the tree to maintain relatively small groups of mutually close nodes. A preferred approach is to pre-cluster the nodes using an overlay organization that is called a Minimum-Delay Tree (MDTree). Nearby nodes in the tree have small delay to each other; thus, on-demand variable size clustering considers only a small subset of the nodes. Each level in an MDTree consists of a neighborhood in which each node is a representative of another neighborhood at a lower level, recursively down to the leaf nodes. Inter-node delays among nodes within the same neighborhood are relatively small.

An MDTree makes it easier to find a specified number of nodes with minimum average delay. By using a hierarchical tree overlay structure, MDTree controls the complexity of node joins and cluster extraction to $O(Log_k N)$, where K is the size of neighborhood on each layer in the tree and N is the number of nodes.

MDTree Architecture

An MDTree employs a hierarchically layered tree structure. Nodes on the same branch of the tree are organized such that they are close to one another in terms of link delay. This structure helps requests to be satisfied with clusters that have small internal average link delays. The terminology used herein is described as follows:

MDTree: All the SOGs nodes are organized in a structure that facilitates resource sharing, information exchange, and cluster formation. This structure is the MDTree.

Layer: All nodes at distance j edges from the root of the MDTree are said to be at layer $L(H-j)$ of the tree, where H is the height of the tree. Total number of layers in an MDTree is approximately $O(Log_k N)$, where N is the total number of nodes in the tree, and K is predefined neighborhood size, which is defined below.

Peer-node: Any participating node is a peer-node.

Super-node: A super-node is the leader of a neighborhood. "Super-node" and "peer-node" are relative concepts. A node can be a peer-node on one layer, and a super-node on another. The super-node of a lower layer neighborhood is also a participant in the neighborhood of the above layer. In other words, every node on layer $L_i$ is a super-node on layer $L_{i-1}$. On the other side, a super-node of layer $L_{i+1}$, must be a super-node for exactly one neighborhood in layers $L_1$ through $L_i$. Super-nodes are key nodes in the structure; they control peer-nodes in their neighborhood, and they are the gateway to the outside of the neighborhood.

Neighborhood: A neighborhood consists of a supernode and all other controlled nodes on a specified layer. Numerous neighborhoods controlled by different super-nodes exist on a specified layer. Lower layers communicate through a respective supernode of a neighborhood in the layer above them. On each layer, nodes within the same neighborhood exchange information with each other, which helps electing new super-node when the current super-node is missing. However, nodes on the same layer but under the control of different super-node, i.e., belonging to different neighborhoods, do not directly communicate, and they do not know the existence of one another.

Community: A community consists of a super-node and the subtree comprising all the neighborhoods on lower layers controlled by that super-node.

Entry Point: A special super-node used to direct new joining nodes to the neighborhood on the highest layer. The entry point is the super-node on the highest layer, and the only participant in this layer.

K: Each neighborhood has a pre-set maximum number of nodes that it can contain; this maximum value, K, is currently a constant of the overlay. Once a neighborhood on layer $L_i$ grows to contain K nodes, the neighborhood eventually splits into two, and the newly generated super-node is promoted into layer $L_{i+1}$. A split may happen immediately after a neighborhood grows to contain K nodes, or at a specified interval, depending on the implementation.

FIG. 1 depicts an example of an MDTree consisting of 16 nodes with K=4. A Super-node keeps information of number of nodes it is controlling on each level, as is shown in the figure, and, in its neighborhood on each layer, the number of nodes controlled by each of its peer-nodes. This information is generally useful for cluster formation.

MDTree construction and maintenance consist of four components: (1) the Node Join Protocol governs how nodes join the tree; (2) Neighborhood Splitting splits a neighborhood into two neighborhoods, when its size exceeds K; (3) a Tree Adjustment process allows nodes to move to more appropriate layers if they get misplaced by the neighborhood splitting process (or otherwise, for example, as nodes leave); and (4) Tree Maintenance mechanisms maintain the tree as nodes leave, by promoting nodes if their super-node leader disappears.

Node Join Protocol

To join the MDTree structure, a new node first queries the Entry Point, which replies with a complete list of top layer nodes. Then the node pings each node in the returned list. As a result of the pings, it finds out the closest node and sends a query to it. From this node, it gets a list of its neighborhood at the lower level. The process is repeated recursively until a layer $L_1$ node is found; the joining node then attaches itself on layer $L_0$ to the found node. When nodes join the system, they are always initially attached to layer $L_0$. Once a neighborhood consists of K nodes, it must eventually be split. Higher layer nodes result from layer splitting.

Neighborhood Splitting

An MDTree's layer structure is dynamic, with layers and super-nodes potentially changing roles and positions when nodes join and leave. When one super-node's number of children reaches K, this neighborhood is split into two. The layer splitting algorithm has significant impact on the performance of the tree; a random split may cause ineffective partitioning, as relatively distant nodes get placed in the same layer. The effect is compounded as additional splits occur. Ideally, when a split occurs, the minimum delay criteria of the tree would be preserved. In other words, the average link delay for each new neighborhood should be minimized.

Because of previous information exchange within the neighborhood, the super-node has all the information about its peer-nodes, including their distance to each other; the presence of this information allows the super-node to effectively partition the neighborhood. Effective partitioning of the neighborhood is critical to the performance of the MDTree. However, optimal bi-partitioning is known to be NP-complete, and it is impractical to enumerate all the combinations and calculate average link delays for each of them when K is relatively large. For this reason, an optimized genetic partitioning algorithm is preferably employed to achieve effective partitioning. However, any heuristic that can efficiently and effectively partition the neighborhood may be used here.

After nodes are partitioned into two new smaller neighborhoods, just for simplicity and avoiding update of this node on all above layers, the super-node $N_a$ of the neighborhood at layer $L_i$ remains the super-node of the neighborhood to which it belongs after the split. Here $N_a$ continues to be a super-node because it may reside on a higher layer. After splitting, if $N_a$ is found to be not the best suitable supernode on that layer, it can be replaced with the best fit node.

In the newly generated neighborhood, $N_b$, the node having the minimum link delay to all other nodes, is appointed to be the super-node of layer $L_i$. (However, for perfection, both super-nodes can be selected like the newly generated neighborhood.) Now both $N_a$ and $N_b$ will participate in the same neighborhood on layer $L_{i+1}$ under the same supernode $N_c$. Now $N_b$, the new super-node, becomes its sibling and a new peer-node of $N_c$. $N_a$ informs all related nodes about the change of leadership. Upon receiving the split message, the new super-node $N_b$ requests to attach to layer $L_{i+1}$ and join $N_c$'s neighborhood. $N_c$, the super-node of $N_a$ now becomes the common super-node of both $N_a$ and node $N_b$. While the minimum link delay is a preferred metric, any other suitable metric may be used, and indeed a multiparameter cost function may be employed, without departing from the scope of the invention. Such metrics or parameters may include economic cost, speed (which may be distinct from delay), power consumption or availability, predicted stability, etc.

Such a split reduces the number of nodes on layer $L_i$, but increases the number of nodes on layer $L_{i+1}$. If the number of nodes in a neighborhood on layer $L_{i+1}$ reaches K, that neighborhood splits.

Tree Adjustment

In general, heuristic approaches do not necessarily consider the full solution space, and can therefore result in suboptimal configurations. For example, a node may unluckily get placed in the wrong branch of a tree due to an early split. Further, neighborhood splitting results in MDTree structure changes, and nodes being promoted to higher layers. However, this may separate nearby nodes into different neighborhoods, and they may eventually migrate away from each other in the tree. Heuristics may allow nodes to recover from such unfortunate placement. For example, a node can through its super-node at layer $L_i$ discover the supernode's neighborhood on $L_{i+1}$. The node can then ping all the nodes in that neighborhood at a fixed infrequent interval to check for a peer of lower link delay, and move itself into that neighborhood (and merge all of its community into the new community). Another possible solution with larger range reposition is contacting the entry node at a fixed interval to get a global reposition. However, too frequent reposition may affect the stability of the MDTree.

Tree Maintenance

It is important to recover from node and super-node failure (or more commonly, departure from the SOG). In a SOG, most nodes may be well behaved and announce their intent to depart. This may allow soft reconfiguration of the tree, by removing the peer-node and electing an alternate super-node for the layers where it serves this duty. The tree provides an efficient structure for multicasting such messages. However, since failures and unannounced departures are possible, nodes in the same neighborhood exchange heartbeat messages. A node is considered absent if it fails to respond to some predefined number of consecutive heartbeat messages; this can trigger tree reconfiguration. Recovery from peer-node departures is handled differently from recovery from super-node departures, as described below.

Peer-node Departure: The departure of a peer-node P simply results that the super-node and other peer nodes in Fe's neighborhood remove P from their records. If the number of nodes in the neighborhood falls below a predefined threshold, the super-node of layer $L_i$ may try to demote itself to a peer-node on layer $L_j$, and join its entire community into that of another super-node on layer $L_j$. This approach can keep the tree structure balanced.

Super-node Departure: Because all MDTree structure information is broadcast within the neighborhood, all peer nodes have the knowledge of the neighborhood. Thus, a new super-node can be elected directly from the neighborhood and promoted in place of the departed super-node.

Cluster Formation

When user on a node requests a cluster of size R, it checks if the number of nodes it controls is larger than the requested size multiplied by a predefined candidate scale factor S, where S>100% so that the requester may select the R most suitable nodes from among a set of more than R nodes should it decide to do so. If it cannot satisfy the request, the request is forwarded recursively to supernodes at higher and higher layers without a DETERMINED flag, until it arrives at a super-node that controls a community that contains more than R*S nodes. This super-node then decides which part of the community under its control should join the cluster, and forwards the request, with DETERMINED flag being set, to those nodes. A cluster request message with DETERMINED flag requires the receiver and all the nodes controlled by the receiver to respond to the original requester with no further judgment. After receiving enough responses from cluster candidates, the requester can then ping each responder and select the closest R nodes; or, the cluster can choose to select a random subset of R nodes, or the first R responders. The structure of MDTree makes the responded nodes be close to each other, and the second selection among the responses provides more flexibility.

The original requester knows the link delay between itself and the responders, but not the delay among the responders. This is a sacrifice of optimality for performance; a perfect selection would require a solution to the NP-complete clustering problem and $O(n^2)$ tests (However, here n reflects the size of the cluster, not the much larger size of the SOG).

The MDTree structure thus preferably organizes nodes based on the link delay between node pairs. This structure makes automatic clustering distributed, scalable, efficient, and effective. The MDTree can also be applied as the foundation for group scheduling using criteria other than link delay. Traditional computational Grids that comprise multiple physical clusters may still benefit from an automatic clustering approach similar to that discussed. In particular, when a large-scale application requires a set of machines that exceed the size of the largest available cluster, the present approach will consider the delay between nodes at different sites, and help identify a large multi-organizational collection of machines to support the application.

In a prototype implementation, a default value of S=180% is set, so requesters receive 1.8 times as many candidate nodes for their cluster as they request, and the requester picks top R responders with least link delay to itself, thus leading to a solution favoring minimum diameter. The original requester only knows the link delay between itself and responders, but not the delay among responders. This is another sacrifice of optimality for performance; a perfect selection would require a solution to the NP-complete clustering problem, and $O(n^2)$ tests (here, however, n reflects the size of the cluster, not the much larger size of the SOG). Of course, alternative heuristics may be employed for final selection of the cluster from among candidate nodes.

It may be assumed that the requester is interested in a nearby cluster, which reduces the application launch delay, and acts as a crude geographical load-balancing technique. However, alternative approaches for cluster formation can be directly supported on top of an MDTree which do not mandate this presumption. For example, the tree can track the load at a coarse granularity, and map the request to a lightly loaded portion of the SOG.

The underlying logic of MDTree is the structure of computer networks. In other words, if node A is close to node B, and node C is also close to node B, then very likely node A will be close to node C.

Scheduling means allocating resources for jobs. It is a fundamental issue in achieving high performance in any Grid system. Effective scheduling policies can maximize system and individual application performance, as well as reduce running time of jobs. Scheduling is in essence a resource allocation problem, i.e. the problem of mapping jobs to the available physical resources according to some criteria.

While a single resource and a single job are matched in conventional bipartite scheduling systems, the group-scheduling strategy matches concurrent jobs, consisting of multiple tasks and requires multiple resources, to multiple available resources that can support them efficiently. The selected resources must be both individually efficient and load balanced (to reduce execution time), and mutually close (to reduce communication time).

Single match making scheduling algorithms for distributed environments typically ignore the impact of communication. This approach greatly simplifies the scheduling problem because it simply tracks the individual node characteristics, rather than tracks the mutual relationship among sets of nodes (which are exponentially large in the number of available nodes). For parallel applications, where each node runs independently, and communication costs do not play a role such an approach is sufficient.

However, SOGs are intended to run computationally intensive parallel multi-task jobs. SOGs therefore target an environment where general parallel applications may be supported. So the communication cost among candidate groups of nodes being considered for supporting a task must be factored in the scheduling decisions. Thus the selected resources have to be mutually close.

Effective scheduling in large-scale computational Grids is challenging due to a need to address a variety of metrics and constraints (resource utilization, response time, global and local allocation policies) while dealing with multiple, potentially independent sources of jobs and a large number of storage, computing, and network resources.

Group-scheduling needs to take into consideration the interaction among tasks, and is even harder. The problem is how to dispatch (or schedule) jobs among processing elements to achieve performance goals, such as minimizing executing time, minimizing communication delays, and maximizing resource utilization. Here a job is a set of tasks that will be carried out on a set of resources, and a task is an atomic operation to be performed on a resource.

To achieve the goal of selecting best resources for parallel tasks, the main foci are:
1. How the resource information is managed.
2. How the scheduling requests are processed.

Several challenges are involved in resource information management. For one thing, effective use of SOGs requires up-to-date information about widely distributed available resources. This is a challenging problem even for general large scale distributed systems particularly taking into account the continuously changing state of the resources. Especially, in SOG environment where nodes may join and leave frequently, discovering dynamic resources must be scalable in number of resources and users and hence, as much as possible, fully decentralized. Effective resource information collection, summarization, and update are important, but difficult.

One difficulty lies in maintaining low storage and update overhead for the whole system and for each individual node in a dynamic and distributed environment. Making scheduling decision requires up-to-date resource status information. However, in a hierarchical model, complete information without aggregation results in high storage and update overhead. In other words, too much aggregation results in inaccurate scheduling decision; on the other hand, too little aggregation results in inefficiency and redundancy. These two aspects need to be balanced.

Another difficulty comes from summarizing resource information to provide accurate results with minimum queries. Resource information should be easy to update and query. It is clear that resource information needs to be aggregated using an effective summarization method. This summarization method should keep important information and filter out unimportant information with low computational and storage overhead.

Scheduling request processing also contains several challenges. One challenge is the difficulty to keep request processing efficient and scalable in a dynamic environment. To be efficient, query messages cannot be passed through too many intermediate nodes. To be scalable, query messages cannot be flooded to a large range of nodes. Another challenge is the difficulty to filter out the best resources when there are more resources satisfying the criteria. Besides clearly stated criteria in a request, implied criteria, such as link delay also need to be considered to select the best resources from more than required candidates.

Both resource management and scheduling request processing can have centralized or distributed solutions. A centralized solution may store all the resource information in a database, or process all the scheduling requests at a central node. Centralized solutions do not scale, especially to the scales expected with the inclusion of desktop resources. In this case, all the resource updates or scheduling requests go to a few dedicated servers. The benefit of centralized solutions is that resource information maintenance is easy and query is efficient since all the information is in the same database. On the other hand, when the scale of the system exceeds the servers' capability, these centralized servers could become the bottleneck of the whole system. In addition, the single point failure problem usually comes with centralized solutions. Thus, centralized solutions do not optimally satisfy the requirements of an SOG environment.

Distributed solutions include purely distributed solutions and hierarchical solutions. These models apply to both resource information management and scheduling requests processing. Distributed solutions usually bear higher maintenance costs overall, but this disadvantage is offset by sharing the costs among all the participating nodes. Purely distributed solutions evenly distribute resource information on all the nodes. Thus system overheads are shared by each node and the solutions are scalable. The nodes are connected together through mechanisms such as a distributed hash table.

In cases addressed by the present technology, the problem of purely distributed solutions is that it is almost impossible for a purely distributed systems to directly support multiple condition matching, or range query, due to the properties of Distributed Hash Tables (DHT).

Hierarchical solutions combine the advantages of both centralized solutions and purely distributed solutions, and thus are more flexible. Hierarchical solutions can be one layer or multi-layer hierarchical. Higher layer nodes store duplicated resource data of lower layer nodes or summary of that information. When it comes to request processing, higher layer nodes forward requests to their appropriate children until nodes at the lowest layer are reached. Hierarchical solutions combine the benefits of both centralized solutions and purely distributed solutions. Hierarchical solutions are therefore preferred. Since MDTree itself is multi-layer hierarchical in terms of overlay topology. It is easier to implement multilayer hierarchical resource management.

In hierarchical model, for requests to be processed, higher layer nodes can either directly respond to the requester or forward requests to appropriate children. Higher layer nodes need to either know accurate information or know who has accurate information. In other words, higher layer nodes need to store either complete information of all the subordinate nodes to make decision or the summary of that information to forward requests. As to resource information management, the respective states of the different resources should be monitored in an efficient and scalable way. Factors considered include system overhead, information collection frequency, and information accuracy.

Based on the MDTree structure, forwarding scheduling requests down to leaf nodes to make final decision is more scalable than making responses on upper nodes, and requires less resource information to be stored on upper layer. It is clear that insufficient summarization or storing complete information at upper layer nodes leads to impaired scalability. On the other hand, too much abstraction means inaccuracy. To achieve the best performance, updating overhead and easiness and accuracy of query need to be balanced. Status update can be propagated in push mode, pull mode or more complicated adaptive mode. Such mechanisms could also be combined.

Obviously, storing only summary of lower layer information reduces the load of upper layer nodes. Preferably, a summary method is employed that keeps most information, reduces resource records, and still deals with complex matching query. The basic requirement is that based on the resource information summary, upper layer nodes need to know which child controls resources satisfying the request criteria. Thus the summary needs to be a vector having at least as many dimensions as the query has.

The relational data model has well known advantages with respect to data independence that lead to simplifying storage and retrieval. Resource data can be stored in relational database or similar data structure. By using the relational data model, flexible general queries (including exclusion) can be formed and answered. In relational data model, records can be aggregated only if values of the corresponding fields are equal. Some attributes have continuous numerical values. In that case, their value ranges need to be quantized into a predefined number of buckets. If a value falls into a bucket, it is summarized by incrementing the count of resources for the corresponding bucket. Aggregating resources this way, we sacrifice some precision to achieve a great reduction in the record number.

For better performance, scheduling requests are normally forwarded to more candidates than the task number. Although these candidates may be already mutually close due to the initial sorting of MDTree, the strategy of further selecting best quality resources still plays an important role.

Effective scheduling depends on efficient resource management. The resource discovery methods in Grid systems fall into two categories: centralized solutions and distributed solutions. Distributed solutions can be further classified, in a way similar to peer-to-peer (P2P) search algorithms, as unstructured and structured, according to their membership and storage organizations. Additional differentiation in the resource management problem lies in whether the resource information is replicated or not, and how it is tracked by the schedulers (push, pull or hybrid).

The majority of the distributed solutions use a variation of either flooding or Distributed Hash Tables (DHT). In general, flooding based solutions incur high overhead, while DHT based solutions cannot readily support complex queries such as multi-attribute and range queries. Furthermore, it is difficult to target resources that are both near to the request initiator and near to each other.

A preferred process of matching appropriate resources in response to a job scheduling request is now described. When a node receives a job scheduling request, it first checks whether it directly or indirectly controls sufficient resources to satisfy the criteria. If the criteria cannot be satisfied, the request is forwarded up to the super node in the neighborhood. The super node, as a peer node at the upper layer, checks the resources it controls, and recursively forwards the request if necessary. Eventually, a super node that controls the desired number of resources is found (or alternatively, the root is reached and the request fails). At that point, the super node that can satisfy the scheduling request criteria puts on a MATCHED flag and forwards the scheduling request down to its children that it identifies as holding relevant resources. The matched scheduling request messages are then passed down in the pruned tree to the leaf nodes. Those branches obviously not matching the criteria are skipped. Since some information is lost in the process of aggregation, the super node only compares the aggregated values. When the leaf nodes with resources receive the matched scheduling request, they check the job attributes and criteria, and then finally decide whether or not to respond to the request initiator. Responses do not have to be routed in the opposite direction with respect to queries; they are directly sent to the job initiator.

Authentication is the act of identifying an individual computer user, while authorization typically refers to the process of determining the eligibility of a properly authenticated identifier (e.g., person) to access a resource. Authentication is the process in which a real-world entity is verified to be who (e.g., person) or what (e.g. compute node, remote instrument) its identifier (e.g., username, certificate subject, etc.) claims. Authorization mechanisms are devised to implement the policies to govern and manage the use of computing resources. So authentication is the basis of Authorization.

For authentication, Grid Security Infrastructure (GSI), which provides the security functionality of the Globus Toolkit, uses public-key authentication infrastructure PKI X.509 proxy certificates to provide credentials for users and to allow for delegation and single sign-on. In GSI, two-party mutual authentication involves straightforward applications of the standard SSL authentication.

In SOG environment, user registration and node participation are separate processes. Participant of a new node does not mean all the users on that node gain access to the SOG. In other word, registered user number is not affected by nodes joining or leaving, and vice versa. It is possible that an SOG user do not have account on any host. On the other hand, an owner of resource may not be an SOG user. User registration relies on registration agents (RAs). These are individuals who are likely to know the persons, who are requesting certificates, firsthand or secondhand. The policies for establishing member identities should be published by each RA, and the procedures for verifying the identities and certificate requests should be consistent among all the RAs and approved by the Certificate Authority (CA). A Grid CA is defined as a CA that is independent of any single organization and whose purpose is to sign certificates for individuals who may be allowed access to the Grid resources, hosts or services running on a single host. On the contrary, node joining and leaving are much more flexible. Nodes don't have to be registered in advance if application are allowed to run on untrusted hosts. Otherwise, new node should at least present a certificate signed by a well known CA.

When a new user joins, an SOG administrator may assign one or more roles to this user, sign this information and save it in the distributed attributes repository. This information can be updated with administrator's signature. Administrator is also a role. When new roles are added, every node is notified to make sure it has corresponding policy for the new role. When new node joins the SOG system, resource owner is required to specify access policy for each existing role, on the joining node. These local policies as well as global policies are stored directly on the node. It is resource owners' responsibility to make sure that resources are not abused. To conform to the view of Service Oriented Architectures (SOA), we presume that resources are accessed through service.

The scalability of data location and query in distributed systems is of paramount concern. It should be possible to extend the system with new resources at a reasonable cost and there should be no performance bottlenecks. P2P overlays are therefore adopted as the basis for attributes repository. Distributed Hash Table (DHT) based structured P2P architecture, such as Chord or CAN can be used. Data lookup takes O(log N) hops, where N is the total number of the nodes in the system. User name is used as the key. Role information related to user is saved in the repository. This Repository mainly used to store role information and global policies. Local policies can also be saved there if they are shared by some resources.

A role-based policy describes a privilege typically consists of a three-tuple attribute, resource, action and the attribute is a two-tuple subject, attribute. This method is more flexible than the discretionary approach. It separates the assignment of privileges into the resource specific definition of access rights (by a policy authority) from the resource agnostic assignment of attributes to subjects (by an attribute authority) and thus allows for the distribution of these tasks to separate authorities. Furthermore, the grouping of subjects into roles enables more scalable management than the direct assignment of rights to subjects allows for. Hierarchical role schemes extend this concept even more by allowing for access right inheritance from less privileged to more privileged roles. In autonomous authorization, the action for the three-tuple is flexibly defined by resource owner.

With the merging of Grid technologies and Web Service-based technologies in OGSA, eXtensible Access Control Markup Language (XACML) is a good choice for specifying access control policies and the associated request/response formats. It allows use and definition of combining algorithms which provide a composite decision over policies governing the access requirements of a resource.

An access token is the evidence that user proxy send to resource proxy to prove its eligibility for service. The access token includes proxy certificate and role information. In order to use grid resources, the user has to be authenticated first. After authentication, a short-lived proxy certificate is generated, which includes the user's identity information. Before request for the service of a specified resource, the user proxy has to retrieve role information from the attributes repository. Then a suitable role is selected from all the roles bound to this user. Proxy certificate and role information together generate an access token. Then user proxy presents the access token to the resource proxy, which uses them in making policy decisions. This last step may be repeated many times using the same access token as long as the proxy certificate and role information do not expire.

It is therefore an object to provide a method for clustering of nodes for a distributed task, comprising automatically partitioning a set of nodes into a branched hierarchy of subsets based at least on a relative proximity according to at least one node characteristic metric, each subset having a supernode selected based on an automatic ranking of nodes within the same subset, each node within the subset being adapted to communication control information with the supernode, and the supernodes of respective subnets which are hierarchically linked being adapted to communicate control information with each other; and outputting a set of preferred nodes for allocation of portions of a distributed task, wherein the output set of preferred nodes is dependent on the hierarchy and the distributed task.

It is a further object to provide a cluster of nodes adapted to perform a distributed task, comprising: a branched hierarchy of nodes, partitioned into subsets of nodes based at least on a relative proximity according to at least one node characteristic metric, each subset each having a supernode selected based on an automatic ranking of nodes within the same subset, each node within the subset being adapted to communication control information with the supernode, and the supernodes of respective subnets which are hierarchically linked being adapted to communicate control information with each other; at least one processor adapted to determine a set of preferred nodes for allocation of portions of a distributed task, wherein the set of preferred nodes is dependent on the hierarchy and the distributed task.

It is another object to provide a computer readable medium, storing instructions for controlling a programmable processor to output a set of preferred nodes for allocation of portions of a distributed task, wherein the output set of preferred nodes is dependent on a branched hierarchy of nodes and the distributed task, wherein the branched hierarchy of nodes is formed by automatically partitioning a set of nodes into a branched hierarchy of subsets based at least on a relative proximity according to at least one node characteristic metric, each subset having a supernode selected based on an automatic ranking of nodes within the same subset, each node within the subset being adapted to communication control information with the supernode, and the supernodes of respective subnets which are hierarchically linked being adapted to communicate control information with each other.

The nodes may be partitioned into the branched hierarchy based on a link delay metric. For example, the at least one node characteristic metric comprises a pair-wise communication latency between respective nodes. The hierarchy may be established based at least in part on proactive communications. The automatic partitioning may be initiated prior to allocating portions of the task, and wherein the hierarchy is modified based on dynamically changing conditions by proactive communications. The proactively communicating may comprise a transmitted heartbeat signal. Preferably, the heartbeat signal is provided as part of a communication between respective nodes provided for at least one other purpose. The automatic partitioning may occurs dynamically while a distributed task is in progress. Likewise, a supernode status may be selected dynamically. A genetic algorithm may be employed to controls the proactive communications to estimate a network state representing the set of nodes, substantially without testing each potential communication link therein. A new node may be placed within the hierarchy or removed from the hierarchy while the distributed task is in progress, and the new node allocated a portion of the distributed task, or a portion of the distributed task formerly performed by the removed node undertaken by another node. A subset (neighborhood) of the hierarchy containing nodes performing a portion of the distributed task may be split into a plurality of subsets, each subset having a node selected to be a supernode, while the distributed task is in progress or otherwise. The preferred number of nodes within a subset (neighborhood) may be dependent on a threshold number, and as the actual number deviates, the hierarchy may be reconfigured accordingly. A node may be moved from one subset to another subset while the node is allocated a portion of the distributed task, wherein a respective supernode for the node is also changed. A node within a subset allocated a portion of the distributed task may be promoted to a supernode if a respective previous supernode is unavailable, wherein said promoting occurs automatically without communications with the previous supernode while the distributed task is in progress. The set of nodes may comprise at least a portion of a grid of computing resources. The grid of computing resources may, in turn, be wholly or partially self-organizing.

The at least one processor may comprise a distributed control system. The at least one processor may comprises a plurality of processors which are part of respective nodes, wherein the allocation of portions of the distributed task to the at least a portion of the nodes is tolerant to a loss of at least one of said processors from the set of nodes. At least one node may have an associated processor which executes a genetic algorithm which controls proactive communications between nodes to estimate a network state representing the set of nodes, substantially without testing each potential communication link therein. The processor may be adapted to place a new node within the hierarchy while the distributed task is in progress, split a subset containing nodes performing a portion of the distributed task into a plurality of subsets, move a node from one subset to another subset while the node is allocated a portion of the distributed task, wherein a respective supernode for the node is changed, and/or promote a node within a subset allocated a portion of the distributed task to a supernode if a respective previous supernode is unavailable. The set of nodes may comprise at least a portion of a grid of computing resources, wherein the grid of computing resources is self-organizing based on logic executed by a respective processor associated with each node.

Further objects will be apparent from a review hereof.

EXPERIMENTAL EVALUATION

Simulation experiments were conducted to evaluate the present approach using the GPS simulation framework [10, 11] and Transit-Stub networks generated from the GT-ITM topology generator [12]. The GPS was extended to model MDTrees, and to support the cluster formation algorithm discussed herein. The topology studied consists of 600 nodes (due to run-time and memory usage considerations). Link delay within a stub is 5 milliseconds (ms), between stubs and transits it is 10 ms, and between transits is set to 30 ms. Cluster requests of sizes 8, 16, 32, 64, 128, and 256 nodes were evaluated. Pings are used to determine the link delay between node pairs. The value of K was set at 25 for the MDTree, and 180% as candidate scale factor S. The following metrics were used to measure the quality of the cluster that an MDTree helps discover:

Average link delay among nodes within the cluster: The average link delay is likely to be the most important criterion for the quality of the clustering, especially for fine-grained applications. Such applications require frequent communication among nodes within the cluster and their performance is bound by the latency of communication.

Maximum link delay to the cluster requester: This criterion is important for clusters in which the most frequent communication is between the cluster requester and the other nodes.

Cluster diameter: The largest link delay between any pair of nodes in the cluster.

Cluster Formation Overhead: The overlay performance is measured by the number of messages sent during the process of requesting a cluster. These messages include cluster request messages, cluster responses, pings, and cluster confirmation. Since the MDTree is constructed pro-actively, the cost is amortized over all the requests generated for clusters; it can be considered as a fixed cost. New node joining only cost approximately $O(Log_k N)$ messages, which includes attach queries and pings, where, again, N is the number of nodes in the SOG, and K is the maximum number of nodes in any neighborhood.

Maintenance Overhead: The overlay performance is measured by the number of messages transmitted in the MDTree.

Figure 1:
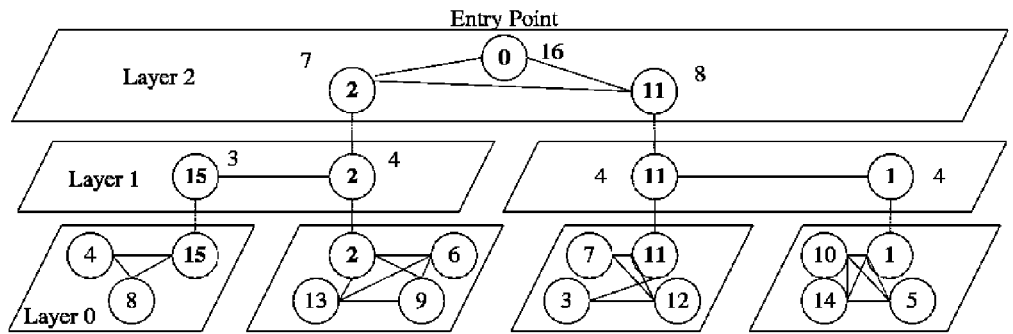
FIG. 1 shows an MDTree of 16 nodes with maximum neighborhood size of K=4. Each super-node is shown in bold, and is labeled with the number of nodes it controls.
Figure 2:
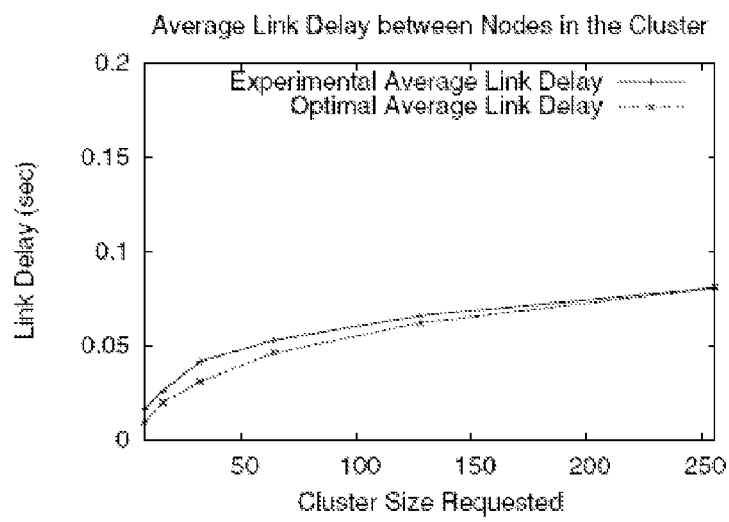
FIG. 2 shows the average Link Delay in a cluster.

FIG. 2 shows the average link delay in the extracted cluster, compared to the optimal cluster for the topology (found through exhaustive search). The average delay, in general, is quite good compared to the optimal available. However, especially at small size clusters (smaller than the layer size), the quality of the solution can be improved. This argues for supporting mechanisms to allow nodes to change their location in the tree if they are not placed well. That is, it is preferred that the system and method support a determination of placement quality, and the communication protocol between nodes support communications which both support the determination of quality of placement and restructuring of the network in case of poor placement, even if this imposes some inefficiency on the operation of well-placed nodes. At 256 nodes, the large size of the cluster relative to the topology size may contribute to the two graphs converging.

Figure 3:
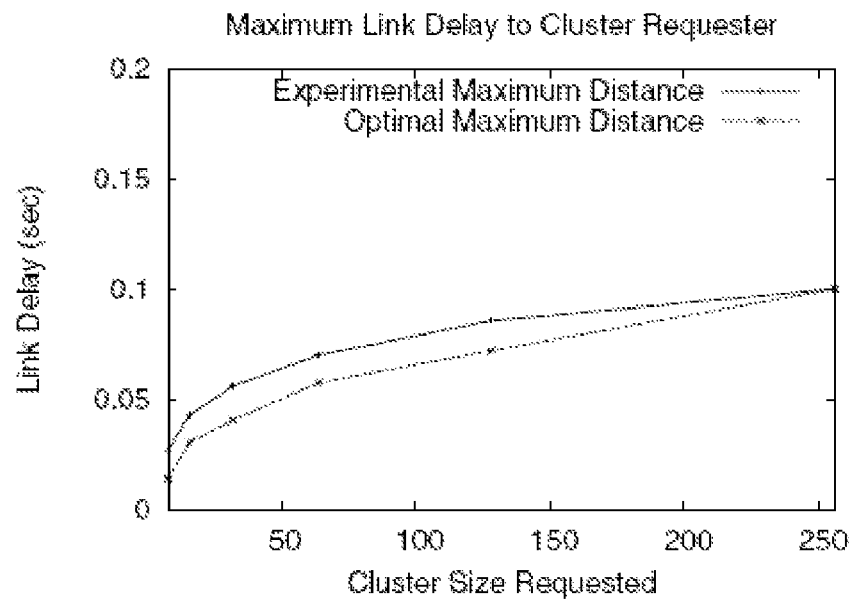
FIG. 3 shows a Maximum Link Delay to the cluster requester.
Figure 4:
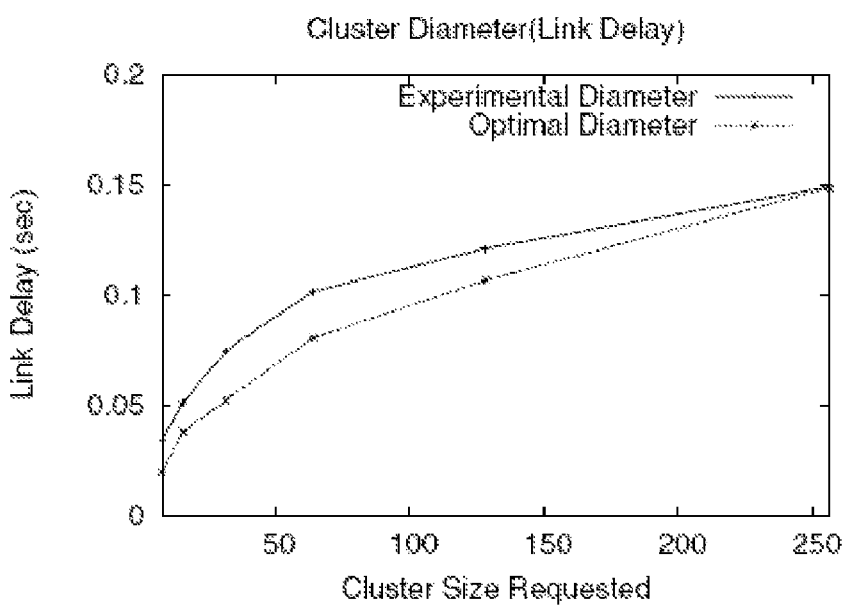
FIG. 4 shows a Cluster Diameter.

FIGS. 3 and 4 show the maximum link delay to the cluster requester, and the cluster diameter respectively. These figures contain a similar result to that of FIG. 2. In general, the results show that the present approach performs well with respect to the optimal solution according to all three metrics. The complexity of the clustering stage (i.e. the messages that are exchanged after a cluster is requested, as opposed to the pro-active MDTree setup costs associated with join messages) depends on the options used in representing the clusters and the MDTree structure (e.g. the values of S and K described earlier).

Figure 5:
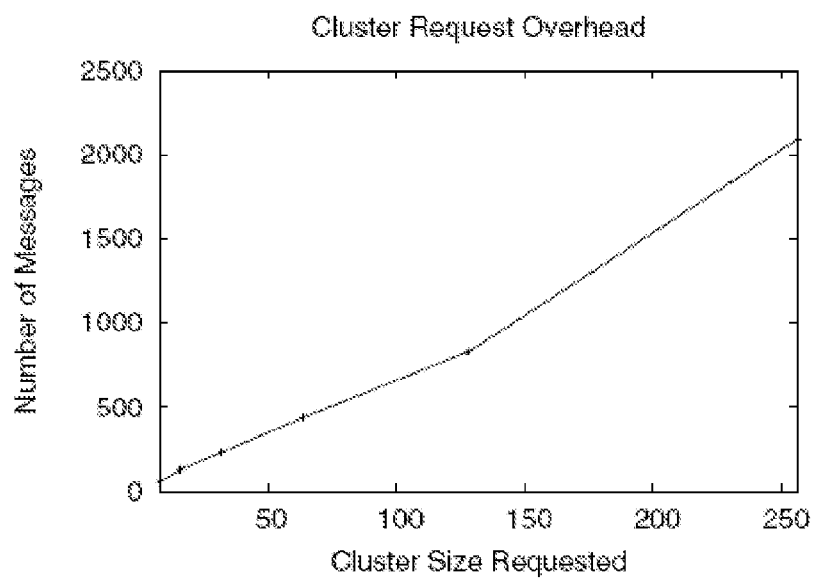
FIG. 5 shows Cluster Requesting Overhead, messages include requests, responses, pings, and cluster confirms.

FIG. 5 shows that the overhead for requesting a cluster appears to be linear with the size of the requested cluster. Building and maintaining the MDTree structure also requires overhead. Node joining costs approximately $O(Log_k N)$ messages and pings. However, the main overhead comes from the periodic heartbeat messages, since it broadcasts to each node in the neighborhood. This overhead can be reduced by piggybacking and merging update messages. Therefore, it is preferred than an independent heartbeat message only be sent if no other communication conveying similar or corresponding information is not sent within a predetermined period. Of course, the heartbeat may also be adaptive, in which case the frequency of heartbeat messages is dependent on a predicted dynamic change of the network. If the network is generally stable, the heartbeat messages may be infrequent, while if instability is predicted, the heartbeats may be sufficiently frequent to optimize network availability. Instability may be predicted, for example, based on a past history of the communications network or SOG performance, or based on an explicit message.

In some cases, the communication network may be shared with other tasks, in which case the overhead of the heartbeat messages may impact other systems, and an increase in heartbeat messages will not only reduce efficiency of the SOG, but also consume limited bandwidth and adversely impact other systems, which in turn may themselves respond by increasing overhead and network utilization. Therefore, in such a case, it may be desired to determine existence of such a condition, and back off from unnecessary network utilization. For example, a genetic algorithm or other testing protocol may be used to test the communication network, to determine its characteristics.

Clearly, super-nodes and regular peer-nodes have different levels of responsibilities in MDTrees. A super-node is a leader on all layers from 1 to the second highest layer it joins. Each super-node must participate in query and information exchange on all the neighborhoods it joins, which can make it heavily burdened. However, if higher layer super-nodes did not appear within neighborhoods at lower layer neighborhoods, it would be inefficient to pass information down to neighborhoods at lower layers.

Graph bi-partitioning is known to be NP-complete [7]. In an MDTree, genetic algorithms may be used for neighborhood splitting. A preferred algorithm generates approximately optimal partitioning results within hundreds or thousands of generations, which is a small number of computations compared to the NP-complete optimal solution (and these computations take place locally within a super-node, requiring no internode messages). Various other known heuristics may be used to bi-partition the nodes. Since MDTree tries to sort close nodes into the same branch, a genetic algorithm is preferable to a random split algorithm, especially for transit-stub topology.

Figure 6:
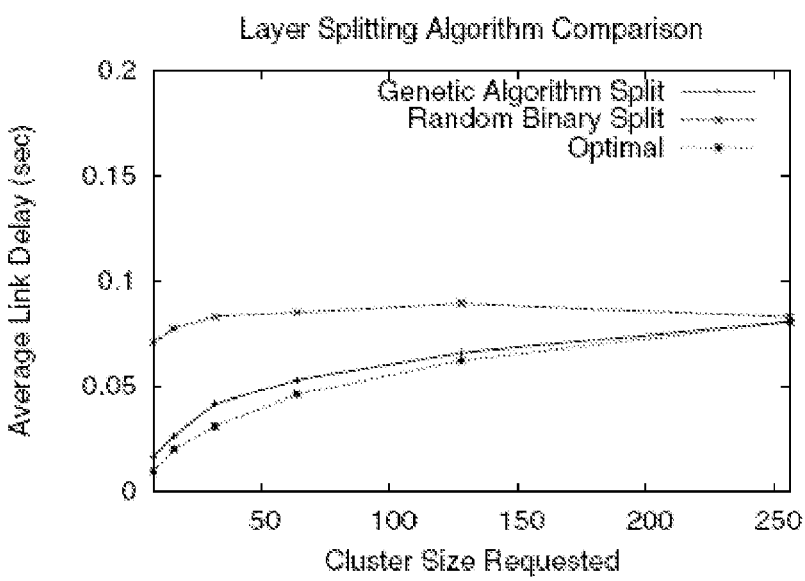
FIG. 6 shows a comparison of Genetic Split and Random Split.

FIG. 6 shows that the genetic algorithm (or any other effective bi-partitioning heuristic) has a significant impact on the quality of the solution when compared to random partitioning for neighborhood splitting.

The present invention provides an efficient data structure and algorithm for implementing automatic node clustering for self-organizing grids, which will contain clusters of high performance "permanent" machines alongside individual intermittently available computing nodes. Users can ask for an "ad hoc" cluster of size N, and the preferred algorithm will return one whose latency characteristics (or other performance characteristic) come close to those of the optimal such cluster. Automatic clustering is an important service for SOGs, but is also of interest for more traditional grids, whose resource states and network characteristics are dynamic (limiting the effectiveness of static cluster information), and whose applications may require node sets that must span multiple organizations.

The MDTree structure organizes nodes based on the link delay between node pairs. The preferred approach is distributed, scalable, efficient, and effective. A genetic algorithm is used for neighborhood splitting to improve the efficiency and effectiveness of partitioning.

In addition, the system and method according to the present invention may provide tree optimization to revisit placement decisions Likewise, the invention may determine the effect of node departure on clustering. Further, the invention may provide re-balancing to recover from incorrect placement decisions. As discussed above, the minimum link delay criterion is but one possible metric, and the method may employ multiple criteria to identify candidate cluster nodes, instead of just inter-node delay. For example, computing capabilities and current load, and the measured bandwidth (total and/or available) between nodes may be employed.

Tiered SOG resources, ranging from conventional clusters that are stable and constantly available, to user desktops that may be donated when they are not in use may be implemented. This variation in the nature of these resources can be accounted for, both in the construction of the MDTrees (e.g., by associating super-nodes with stable nodes) and during the extraction of clusters (e.g., by taking advantage of known structure information like the presence of clusters, instead of trying to automatically derive all structure).

The present invention may also provide resource monitoring for co-scheduling in SOGs. Resource monitoring and co-scheduling have significant overlap with automatic clustering, and therefore a joint optimization may be employed. Effective SOG operation also requires service and application deployment, fault tolerance, and security.

REFERENCES

[1] Enabling grids for e-science (EGEE). http://public.euegee.org.
[2] Seti@home. http://setiathome.berkeley.edu.
[3] Teragrid. http://www.teragrid.org.
[4] N. Abu-Ghazaleh and M. J. Lewis. Short paper: Toward self-organizing grids. In *Proceedings of the IEEE International Symposium on High Performance Distributed Computing (HPDC-15)*, pages 324-327, June 2006. Hot Topics Session.
[5] A. Agrawal and H. Casanova. Clustering hosts in p2p and global computing platforms. In *The Workshop on Global and Peer-to-Peer Computing on Large Scale Distributed Systems*, Tokyo, Japan, April 2003.
[6] S. Banerjee, C. Kommareddy, and B. Bhattacharjee. Scalable peer finding on the internet. In *Global Telecommuni-* cations Conference, 2002. GLOBECOM '02, volume 3, pages 2205-2209, November 2002.

[7] M. R. Garey and D. S. Johnson. *Computers and Intractability: A Guide to the Theory of NP-Completeness*. W.H. Freeman & Co., New York, N.Y., USA, 1979.

[8] E. K. Lua, J. Crowcroft, and M. Pias. Highways: Proximity clustering for scalable peer-to-peer network. In *4th International Conference on Peer-to-Peer Computing (P2P 2004)*, Zurich, Switzerland, 2004. IEEE Computer Society.

[9] Q. Xu and J. Subhlok. Automatic clustering of grid nodes. In *6th IEEE/ACM International Workshop on Grid Computing*, Seattle, Wash., November 2005.

[10] W. Yang. General p2p simulator. http://www.cs.binghamton.edu/wyang/gps.

[11] W. Yang and N. Abu-Ghazaleh. GPS: A general peer-to-peer simulator and its use for modeling bittorrent. In *Proceedings of 13th Annual Meeting of the IEEE International Symposium on Modeling, Analysis, and Simulation of Computer and Telecommunication Systems (MASCOTS '05*, pages 425-432, Atlanta, Ga., September 2005.

[12] E. W. Zegura, K. L. Calvert, and S. Bhattacharjee. How to model an internetwork. In *IEEE Infocom*, volume 2, pages 594-602, San Francisco, Calif., March 1996. IEEE.

[13] W. Zheng, S. Zhang, Y. Ouyang, F. Makedon, and J. Ford. Node clustering based on link delay in p2p networks. In *2005 ACM Symposium on Applied Computing*, 2005.

What is claimed is:

1. A method for clustering of nodes for a task, comprising automatically partitioning a set of nodes into a branched hierarchy of subsets as nodes join and leave the set, using a genetic algorithm and based at least on a relative distance according to at least one node characteristic distance metric, each subset having a communication node, each node within the subset being adapted to communicate control information with the communication node, and the communication node of respective subnets which are hierarchically linked being configured to communicate control information with each other; and outputting a set of preferred nodes for allocation of portions of a task, wherein the output set of preferred nodes is dependent on both the hierarchy and the task.

2. The method according to claim 1, wherein the nodes are partitioned into the branched hierarchy based on a link delay metric.

3. The method according to claim 1, wherein the at least one node characteristic metric comprises a pairwise communication latency between respective nodes.

4. The method according to claim 1, wherein said automatically partitioning is initiated prior to allocating portions of the task, and wherein the hierarchy is modified based on dynamically changing conditions by proactive communications.

5. The method according to claim 4, wherein said proactively communicating comprises transmitting a heartbeat signal.

6. The method according to claim 5, wherein the heartbeat signal is provided as part of a communication between respective nodes provided for at least one other purpose.

7. The method according to claim 1, wherein the automatically partitioning occurs dynamically while a task is in progress.

8. The method according to claim 1, wherein a status of a note as a communication node is selected dynamically.

9. The method according to claim 1, wherein the hierarchy is established based at least in part on proactive communications.

10. The method according to claim 9, wherein a genetic algorithm controls the proactive communications to estimate a network state representing the set of nodes, substantially without testing each potential communication link therein.

11. The method according to claim 1, further comprising placing a new node within a subset, or deleting an existing node from the subset, while the task is in progress, and reallocating a portion of the task in response to the change in the set of nodes.

12. The method according to claim 1, further comprising splitting a subset containing nodes performing a portion of the task into a plurality of subsets, each subset having a node selected to be a communication node, while the task is in progress.

13. The method according to claim 1, wherein a number of nodes within a subset is dependent on a threshold number.

14. The method according to claim 1, further comprising moving a node from one subset to another subset while the node is allocated a portion of the task, wherein a respective communication node associated with the node is changed.

15. The method according to claim 1, further comprising promoting a node within a subset allocated a portion of the task to a communication node if a respective previous communication node is unavailable, wherein said promoting occurs automatically without communications with the previous communication node while the task is in progress.

16. The method according to claim 1, wherein the set of nodes comprises at least a portion of a grid of computing resources.

17. The method according to claim 16, wherein the grid of computing resources is self-organizing.

18. A cluster of nodes adapted to perform a task, comprising:
a branched hierarchy of nodes, partitioned into subsets of nodes as nodes join and leave the set, using a genetic algorithm and based at least on a distance according to at least one node characteristic metric, each subset each having a communication node selected based on an automatic ranking of nodes within the same subset, each node within the subset being adapted to communicate control information with the communication node, and the communication nodes of respective subnets which are hierarchically linked and are adapted to communicate control information with each other; and
at least one automated processor configured to determine a set of preferred nodes for allocation of portions of a task, wherein the set of preferred nodes is dependent on the hierarchy and the task.

19. The cluster of nodes according to claim 18, wherein said at least one processor comprises a distributed control, which are part of respective nodes, wherein the allocation of portions of the task to the at least a portion of the nodes is tolerant to a loss of at least one of said processors from the set of nodes.

20. The cluster of nodes according to claim 18, at least one node characteristic metric comprises at least one of a link delay metric, and a pairwise communication latency between respective nodes, wherein the at least one automated processor is configured to add new nodes, eliminate existing nodes, and partition the branched hierarchy of nodes into different subsets of nodes dynamically during performance of a task.

21. A non-transitory computer readable medium, storing instructions for controlling a programmable processor to output a set of preferred nodes for allocation of portions of a task, wherein the output set of preferred nodes is dependent on both a branched hierarchy of nodes and the task, wherein the branched hierarchy of nodes is formed by automatically partitioning a set of nodes into a branched hierarchy of subsets as nodes join and leave the set, using a genetic algorithm and based at least on a task-dependent distance metric, each subset having a communication node selected based on an automatic ranking of nodes within the same subset, each node within the subset being adapted to communication control information with the communication node, and the communication nodes of respective subnets which are hierarchically linked being adapted to communicate control information with each other.

* * * * *